(12) United States Patent
Nam et al.

(10) Patent No.: US 10,358,581 B2
(45) Date of Patent: Jul. 23, 2019

(54) ADHESIVE FILM FOR POLARIZING PLATE, POLARIZING PLATE AND OPTICAL DISPLAY COMPRISING THE SAME

(71) Applicant: SAMSUNG SDI CO., LTD., Yongin-si, Gyeonggi-do (KR)

(72) Inventors: Irina Nam, Suwon-si (KR); Dae Yun Kim, Suwon-si (KR); Young Jong Kim, Suwon-si (KR); Won Kim, Suwon-si (KR); In Cheon Han, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 15/360,557

(22) Filed: Nov. 23, 2016

(65) Prior Publication Data
US 2017/0145262 A1 May 25, 2017

(30) Foreign Application Priority Data

Nov. 24, 2015 (KR) .................. 10-2015-0165069
Dec. 11, 2015 (KR) .................. 10-2015-0177495

(51) Int. Cl.
| | | |
|---|---|---|
| *C09J 7/00* | (2018.01) | |
| *G02B 5/30* | (2006.01) | |
| *B32B 7/12* | (2006.01) | |
| *B32B 23/08* | (2006.01) | |
| *B32B 23/20* | (2006.01) | |
| *B32B 27/30* | (2006.01) | |
| *C09J 7/10* | (2018.01) | |
| *C09J 133/14* | (2006.01) | |
| *B32B 27/08* | (2006.01) | |
| *B32B 27/18* | (2006.01) | |
| *B32B 27/22* | (2006.01) | |
| *B32B 27/26* | (2006.01) | |
| *B32B 27/28* | (2006.01) | |
| *B32B 27/32* | (2006.01) | |
| *B32B 27/34* | (2006.01) | |
| *B32B 27/36* | (2006.01) | |
| *G02F 1/1335* | (2006.01) | |
| *C09J 133/06* | (2006.01) | |

(52) U.S. Cl.
CPC .................... *C09J 7/00* (2013.01); *B32B 7/12* (2013.01); *B32B 23/08* (2013.01); *B32B 23/20* (2013.01); *B32B 27/08* (2013.01); *B32B 27/18* (2013.01); *B32B 27/22* (2013.01); *B32B 27/26* (2013.01); *B32B 27/281* (2013.01); *B32B 27/285* (2013.01); *B32B 27/286* (2013.01); *B32B 27/304* (2013.01); *B32B 27/306* (2013.01); *B32B 27/308* (2013.01); *B32B 27/32* (2013.01); *B32B 27/325* (2013.01); *B32B 27/34* (2013.01); *B32B 27/36* (2013.01); *B32B 27/365* (2013.01); *C09J 7/10* (2018.01); *C09J 133/14* (2013.01); *G02B 5/3033* (2013.01); *B32B 2250/02* (2013.01); *B32B 2250/03* (2013.01); *B32B 2250/04* (2013.01); *B32B 2250/24* (2013.01); *B32B 2255/10* (2013.01); *B32B 2255/26* (2013.01); *B32B 2307/4026* (2013.01); *B32B 2307/412* (2013.01); *B32B 2307/42* (2013.01); *B32B 2307/50* (2013.01); *B32B 2307/536* (2013.01); *B32B 2307/548* (2013.01); *B32B 2307/702* (2013.01); *B32B 2307/732* (2013.01); *B32B 2457/20* (2013.01); *B32B 2457/202* (2013.01); *C09J 133/066* (2013.01); *C09J 2201/622* (2013.01); *C09J 2203/318* (2013.01); *C09J 2401/00* (2013.01); *C09J 2433/00* (2013.01); *G02F 1/133528* (2013.01); *G02F 2202/28* (2013.01)

(58) Field of Classification Search
None
See application file for complete search history.

(56) References Cited

U.S. PATENT DOCUMENTS

| | | | | |
|---|---|---|---|---|
| 9,624,410 B2* | 4/2017 | Nam | ................... | C09J 7/22 |
| 2005/0137374 A1* | 6/2005 | Roesler | ............... | C08G 18/283 |
| | | | | 528/44 |
| 2009/0116111 A1* | 5/2009 | Toyama | ............... | C09J 7/0246 |
| | | | | 359/580 |
| 2009/0317592 A1* | 12/2009 | Yoshitomi | ............... | B32B 3/30 |
| | | | | 428/142 |

(Continued)

FOREIGN PATENT DOCUMENTS

| | | |
|---|---|---|
| CN | 102533172 A | 7/2012 |
| CN | 102952505 A | 3/2013 |

(Continued)

OTHER PUBLICATIONS

"Additives" from BASF, retrived on Oct. 28, 2017.*

(Continued)

*Primary Examiner* — Anish P Desai
(74) *Attorney, Agent, or Firm* — Lewis Roca Rothgerber Christie LLP

(57) ABSTRACT

An adhesive film for polarizing plates, a polarizing plate including the same, and an optical display including the same are provided. An adhesive film for polarizing plates is formed of an adhesive composition including a (meth) acrylic copolymer and a cellulose ester binder. The (meth) acrylic copolymer contains an alkyl group, a hydroxyl group, an alicyclic group, and a hetero-alicyclic group. The adhesive film has a modulus at 30° C. of about 100,000 Pa or more.

17 Claims, 2 Drawing Sheets

(56) References Cited

U.S. PATENT DOCUMENTS

| | | | | |
|---|---|---|---|---|
| 2013/0040123 A1* | 2/2013 | Cho | ............... | C09J 133/08 |
| | | | | 428/220 |
| 2015/0361309 A1* | 12/2015 | Combs | ............... | C09J 103/06 |
| | | | | 156/336 |
| 2016/0177145 A1* | 6/2016 | Nam | ............... | C09J 133/14 |
| | | | | 524/40 |

FOREIGN PATENT DOCUMENTS

| | | |
|---|---|---|
| CN | 104231952 A | 12/2014 |
| CN | 105713536 A | 6/2016 |
| JP | 2015-010192 A | 1/2015 |
| KR | 10-2009-0098684 A | 9/2009 |
| KR | 10-1010889 B1 | 1/2011 |
| KR | 10-1351620 B1 | 1/2014 |
| KR | 10-2014-0085259 A | 7/2014 |
| KR | 10-2015-0032544 A | 3/2015 |
| KR | 10-2015-0063267 A | 6/2015 |
| KR | 10-2015-0102625 A | 9/2015 |

OTHER PUBLICATIONS

I-Eun Kim et al., machine translation of Korean unexamined patent application No. 10-2015-0032544A, published Mar. 26, 2015. (Year: 2015).*

China Office action dated Apr. 3, 2018 in corresponding Chinese Patent Application No. 201611048768.1 (5 pgs.).

China Office Action dated Dec. 12, 2018 in corresponding Chinese Patent Application No. 201611048768.1 (5 pgs.).

Korean Office action from corresponding Korean Application No. 10-2015-0177495, Korean Office action dated Jun. 21, 2018 (7 pgs.).

* cited by examiner

FIG. 1A
FIG. 1B
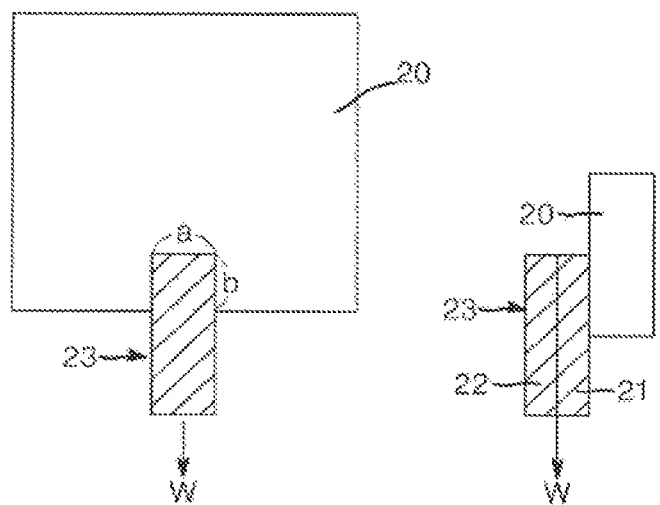
FIG. 2
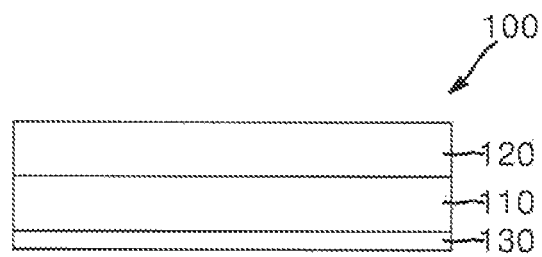
FIG. 3
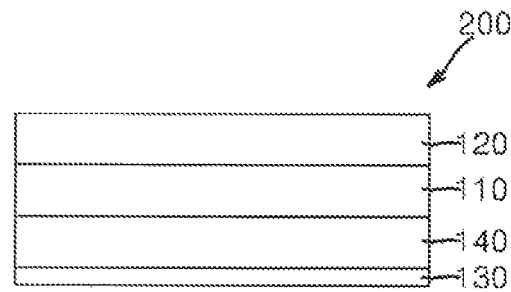

ADHESIVE FILM FOR POLARIZING PLATE, POLARIZING PLATE AND OPTICAL DISPLAY COMPRISING THE SAME

CROSS-REFERENCE TO RELATED APPLICATION

This application claims priority to and the benefit of Korean Patent Application No. 10-2015-0165069, filed on Nov. 24, 2015 in the Korean intellectual Property Office, and Korean Patent Application No. 10-2015-0177495, filed on Dec. 11, 2015 in the Korean intellectual Property Office, the entire content of both of which is incorporated herein by reference.

BACKGROUND

1. Field

Aspects of embodiments of the present invention relate to an adhesive film for polarizing plates, polarizing plate including the same, and an optical display including the same.

2. Description of the Related Art

A liquid crystal display includes a liquid crystal panel and polarizing plates attached to both surfaces of the liquid crystal panel. Each of the polarizing plates includes a polarizer and a protective film formed on one or both surfaces of the polarizer to protect the polarizer. The polarizing plate is attached to the liquid crystal panel via an adhesive film for polarizing plates. The adhesive film for polarizing plates is formed of an adhesive composition for polarizing plates.

A polarizing plate on a glass plate such as a liquid crystal panel has high pencil hardness. However, when measured after attaching the polarizing plate to such a glass plate via an adhesive film for polarizing plates, the pencil hardness of the polarizing plate on the adhesive film is lower than that of the polarizing plate on the glass plate. When the polarizing plate attached to the liquid crystal panel via the adhesive film exhibits low pencil hardness, the polarizing plate is not suitable for use in optical displays.

An adhesive film for polarizing plates having high modulus can increase pencil hardness of a polarizing plate on the adhesive film. However, an adhesive film exhibiting high modulus at high temperature can cause light leakage and deterioration in durability, such as detachment of the polarizing plate, dragging, or generation of bubbles. Light leakage, durability deterioration, and the like occur due to shrinkage of the polarizers by heat and/or moisture. Therefore there is a need for an adhesive film for polarizing plates, which can act as a hard type adhesive film having high modulus at room temperature so as to increase pencil hardness of a polarizing plate on the adhesive film and can act as a soft type adhesive film having low modulus at high temperature so as to suppress light leakage while improving durability. A typical hard type adhesive film has low modulus at high temperature. However, the degree of modulus reduction at high temperature is significantly low, thereby causing light leakage or poor durability at high temperature.

The background technique of the present invention is disclosed in Japanese Patent Publication No. 2015-010192 A.

SUMMARY

In accordance with an aspect of embodiments of the present invention, an adhesive film for polarizing plates is formed of an adhesive composition including: a (meth) acrylic copolymer, which contains an alkyl group, a hydroxyl group, an alicyclic group, and a hetero-alicyclic group; and a cellulose ester binder, and has a modulus at 30° C. of about 100,000 Pa or more.

In accordance with another aspect of embodiments of the present invention, an adhesive film for polarizing plates has a creep at 25° C. of about 200 μm or less, a modulus ratio of about 1.5 or more as represented by the following Equation 1, and a modulus of about 100,000 Pa or more at 30° C.:

$$\text{Modulus ratio} = A/B \quad \text{Equation 1}$$

where A is the modulus of the adhesive film at 30° C. and B is modulus of the adhesive film at 120° C.

In accordance with one or more embodiments the adhesive film has a creep of about 250 μm or more at 85° C.

In accordance with one or more embodiments, the adhesive film has a modulus of about 80,000 Pa or less at 120° C.

In accordance with one or more embodiments of the present invention, a polarizing plate includes: an adhesive film for polarizing plates, a polarizer, and an optical film sequentially stacked in the stated order, wherein the polarizing plate has a pencil hardness of about 2H or more, and the adhesive film for polarizing plates has a creep at 85° C. of about 250 μm or more and a creep at 25° C. of about 200 μm or less.

In accordance with one or more embodiments of the present invention, an optical display includes the adhesive film for polarizing plates or the polarizing plate according to an embodiment of the present invention.

BRIEF DESCRIPTION OF THE DRAWINGS

FIGS. 1A and 1B are schematic diagrams illustrating measurement of creep from a front view and a partial side view, respectively.

FIG. 2 is a cross-sectional view of a polarizing plate according to an embodiment of the present invention.

FIG. 3 is a cross-sectional view of a polarizing plate according to another embodiment of the present invention.

DETAILED DESCRIPTION

Figure 4:
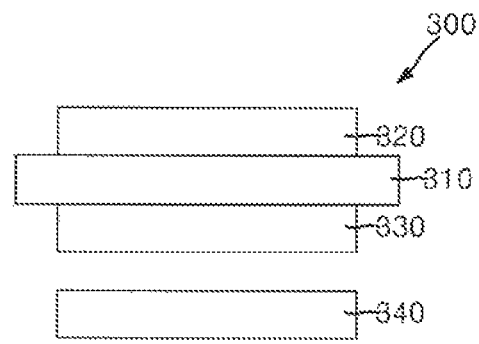
FIG. 4 is a cross-sectional view of a liquid crystal display according to an embodiment of the present invention.

Hereinafter, some embodiments of the present invention will be described in further detail with reference to the accompanying drawings to enable those skilled in the art to easily practice the present invention. It should be understood that the present invention may be embodied in different ways and is not limited to the following embodiments. In the drawings, portions irrelevant to the description will be omitted for clarity. Like components will be denoted by like reference numerals throughout the specification.

Herein, spatially relative terms such as "upper" and "lower" are defined with reference to the accompanying drawings. Thus, it will be understood that "upper surface" can be used interchangeably with "lower surface."

Herein, the terms "adhesive film for polarizing plates" and "adhesive composition for polarizing plates" can be simply represented by the terms "adhesive film" and "adhesive composition," respectively.

Herein, the term "(meth)acryl" refers to acryl and/or methacryl.

Herein, the term "modulus" of an adhesive film refers to storage modulus thereof, and moduli at 30° C. and at 120° C. are measured on a 500 μm thick circular specimen having a diameter of 8 mm under conditions of a strain of 5%, an angular frequency (ω) of 10 rad/sec and a normal force of 1.5 N using a Physica MCR501 (Anton Paar Co., Ltd.) while heating the specimen on a 8 mm-diameter disc from 0° C. to 150° C. at 10° C./min, in which the specimen is prepared by stacking a plurality of adhesive films each having a thickness of 20 μm, followed by cutting the stacked adhesive films. Here, each of the adhesive films is a 20 μm-thick, adhesive film formed by coating an adhesive composition onto a silicone-coated polyethylene terephthalate release film, drying at 105° C. for 4 minutes, and aging at 35° C. and 45 relative humidity for 48 hours, and separating the release film, without being limited thereto.

Herein "creep" means a pushed distance, as measured by the following method. Referring to FIGS. 1A and 1B, a specimen 23 for measurement of creep is attached in an area of a×b (for example, 15 mm×15 mm) to a distal end of an alkali-free glass plate 20 and pulled by a weight W for 1,000 seconds, followed by measuring a pushed distance of the specimen 23 from the alkali-free glass plate 20. The specimen 23 includes a 20 μm thick adhesive film 21 and a polarizing plate 22 formed on the adhesive film 21. The polarizing plate 22 includes a triacetylcellulose film, a polarizer, and a triacetylcellulose film stacked in the stated order. The weight W is 2,250 g at a creep measurement temperature of 25° C. and 1,500 g at a creep measurement temperature of 85° C. Creep can be measured using a Texture Analyzer TA.XT PLus (load cell 5 kg, EKO Instruments). Here, the adhesive film may be the same as the adhesive film used in the above-described measurement of modulus.

Herein, "pencil hardness of a polarizing plate on an adhesive layer" is measured using a pencil hardness meter (Heidon) in accordance with JIS K5400, in which the polarizing plate is disposed on the adhesive film placed on a glass plate for measurement of pencil hardness. The pencil hardness of the polarizing plate on the adhesive film is measured with respect to a specimen prepared by sequentially stacking an adhesive film, a 40 μm thick triacetylcellulose film, an 8 μm thick polarizer, and a 40 μm thick triacetylcellulose film. The adhesive film of the specimen is attached to the glass plate to secure the specimen to the glass plate and is subjected to autoclaving at 5 atm and 50° C. for 1,000 seconds. Before measurement of pencil hardness, the specimen was maintained at 23° C. and 55% relative humidity for 24 hours. Pencil hardness is measured on the surface of the triacetylcellulose film using a Coretech pencil hardness meter (Coretech Korea). Specifically, pencil hardness is measured under conditions of a pencil weight of 500 g and a scratch speed of 48 mm/min on the triacetylcellulose film. Upon testing five times using the same pencil, a pencil hardness value allowing no scratch to be observed all five times is taken as the maximum pencil hardness of the polarizing plate.

An adhesive film for polarizing plates according to an embodiment of the present invention and an adhesive composition for the adhesive film are described below.

An adhesive film for polarizing plates according to an embodiment of the present invention may include: a (meth) acrylic copolymer, which includes an alkyl group, a hydroxyl group, an alicyclic group, and a hetero-alicyclic group; and a cellulose ester binder.

The adhesive film may have high modulus at 30° C. due to hydrogen bonding between the hetero-alicyclic group of the (meth)acrylic copolymer and the cellulose ester binder. In an embodiment, the adhesive film may have a modulus at 30° C. of about 100,000 Pa or more, and, in one embodiment, about 100,000 Pa to about 450,000 Pa, for example, about 100,000 Pa, about 110,000 Pa, about 120,000 Pa, about 130,000 Pa, about 140,000 Pa, about 150,000 Pa, at out 160,000 Pa, about 170,000 Pa, about 180,000 Pa, about 190,000 Pa, about 200,000 Pa, about 210,000 Pa, about 220,000 Pa, about 230,000 Pa, about 240,000 Pa, about 250,000 Pa, about 260,000 Pa, about 270,000 Pa, about 280,000 Pa, about 290,000 Pa, about 300,000 Pa, about 310,000 Pa, about 320,000 Pa, about 330,000 Pa, about 340,000 Pa, about 350,000 Pa, about 360,000 Pa, about 370,000 Pa, about 380,000 Pa, about 390,000 Pa, about 400,000 Pa, about 410,000 Pa, about 420,000 Pa, about 430,000 Pa, about 440,000 Pa, or about 450,000 Pa. Within this range, the adhesive film exhibits good properties in terms of machinability at room temperature, processability, and reliability, and can secure high hardness of a polarizing plate while suppressing warpage and light leakage.

Due to the presence of the (meth)acrylic copolymer and the cellulose ester binder, the adhesive film can have low modulus at 120° C., low creep at room temperature, and high creep at high temperature. In an embodiment, the adhesive film may have a modulus at 120° C. of about 80,000 Pa or less, and, in one embodiment, about 20,000 Pa to about 80,000 Pa, for example, about 20,000 Pa, about 30,000 Pa, about 40,000 Pa, about 50,000 Pa, about 60,000 Pa, about 70,000 Pa, or about 80,000 Pa. Within this range, the adhesive film can suppress light leakage at high temperature while improving durability. In an embodiment, the adhesive film may have a creep at 25° C. of about 200 μm or less and a creep at 85° C. of about 250 μm or more. Within this range, the adhesive film can have low creep at room temperature so as to act as a hard type adhesive film at room temperature, thereby improving pencil hardness of a polarizing plate thereon, and can have high creep at high temperature so as to act as a soft type adhesive film at high temperature, thereby suppressing light leakage while improving adhesion and durability. In an embodiment, the adhesive film may have a creep at 25° C. of about 50 μm to about 200 μm, for example, about 50 μm, about 60 μm, about 70 μm, about 80 μm, about 90 μm, about 100 μm, about 110 μm, about 120 μm, about 130 μm, about 140 μm, about 150 μm, about 160 μm, about 170 μm, about 180 μm, about 190 μm, or about 200 μm, and a creep at 85° C. of about 250 μm to about 800 μm, and, in one embodiment, about 250 μm to about 500 μm, for example, about 250 μm, about 300 μm, about 350 μm, about 400 μm, about 450 μm, about 500 μm, about 550 μm about 600 μm, about 650 μm, about 700 μm, about 750 μm, or about 800 μm.

Thus, as compared with a typical adhesive film for polarizing plates, the adhesive film for polarizing plates according to embodiments of the present invention has high modulus at room temperature (for example, 30° C.) and significantly low modulus at high temperature and/or under high temperature/humidity conditions (for example, 120° C.), thereby increasing pencil hardness of a polarizing plate on the adhesive film and improving durability while suppressing light leakage at high temperature. The adhesive film for polarizing plates according to embodiments of the present invention may have a modulus ratio of about 1.5 or more, and, in one embodiment, about 1.5 to about 50, and, in one embodiment, about 1.8 to about 30, and, in one embodiment, about 4 to about 20, for example, about 4, about 5, about 6, about 7, about 8, about 9, about 10, about 11, about 12, about 13, about 14, about 15, about 16, about 17, about 18, about 19, or about 20, as calculated by Equation 1:

$$\text{Modulus ratio} = A/B \qquad \text{Equation 1}$$

where A is the modulus of the adhesive film for polarizing plates at 30° C. and B is the modulus of the adhesive film for polarizing plates at 120° C.

The adhesive film for polarizing plates is optically transparent and thus can be used in an optical display. In an embodiment, the adhesive film has may have a light transmittance of about 85% or more, and, in one embodiment, about 85% to about 99.9%, as measured in a visible spectrum (for example, at a wavelength of about 380 nm to about 780 nm).

The adhesive film for polarizing plates may have a thickness of about 40 μm or less, and, in one embodiment, about 5 μm to about 30 μm. Within this range, the adhesive film can be used in an optical display.

The adhesive film for polarizing plates may be produced by coating an adhesive composition for polarizing plates to a thickness (e.g., a predetermined thickness), followed by drying and aging under constant temperature/humidity conditions, for example, at about 25° C. to about 35° C. and about 30% relative humidity to about 60% relative humidity, without being limited thereto.

Next, the adhesive composition for polarizing plates according to an embodiment of the present invention will be described in further detail.

The adhesive composition may include: a (meth)acrylic copolymer, which includes an alkyl group, a hydroxyl group, an alicyclic group, and a hetero-alicyclic group; a curing agent; and a cellulose ester binder.

The (meth)acrylic copolymer, which includes the alkyl group, the hydroxyl group, the alicyclic group, and the hetero-alicyclic, group, can form a matrix of the adhesive film for polarizing plates. The (meth)acrylic copolymer, which includes the alkyl group, the hydroxyl group, the alicyclic group, and the hetero-alicyclic group, can increase the modulus of the adhesive film at 30° C. through coupling between the hetero-alicyclic group and the cellulose ester binder. The (meth)acrylic copolymer, which includes the alkyl group, the hydroxyl group, the acyclic group, and the hetero-alicyclic group, may be a copolymer of a monomer mixture including an alkyl group-containing (meth)acrylic monomer, a hydroxyl group-containing (meth)acrylic monomer, an alicyclic group-containing (meth)acrylic monomer, and a hetero-alicyclic group-containing (meth)acrylic monomer.

The alkyl group-containing (meth)acrylic monomer may include an unsubstituted $C_4$ to $C_{12}$ alkyl group-containing (meth)acrylic acid ester. In an embodiment, the unsubstituted $C_4$ to $C_{12}$ alkyl group-containing (meth)acrylic acid ester may include at least one of n-butyl (meth)acrylate, t-butyl (meth)acrylate, iso-butyl (meth)acrylate, pentyl (meth)acrylate, hexyl (meth)acrylate, 2-ethylhexyl (meth)acrylate, heptyl (meth)acrylate, octyl (meth)acrylate, iso-octyl (meth)acrylate, nonyl (meth)acrylate, decyl (meth)acrylate, and dodecyl (meth)acrylate, without being limited thereto. These may be used alone or in combination thereof.

In the (meth)acrylic copolymer, the alkyl group-containing (meth)acrylic monomer can form a matrix of the adhesive film, increase mechanical strength thereof, and provide adhesion and stickiness thereto. The alkyl group-containing (meth)acrylic monomer may be present in an amount of about 40 mol % to about 95 mol %, and, in one embodiment, about 45 mol % to about 90 mol %, and, in one embodiment, about 55 mol % to about 85 mol %, for example, about 40 mol %, about 45 mol %, about 50 mol %, about 55 mol %, about 60 mol %, about 65 mol %, about 70 mol %, about 75 mol %, about 80 mol %, about 85 mol %, about 90 mol %, or about 95 mol %, in the monomer mixture. Within this range, the alkyl group-containing (meth)acrylic monomer can increase mechanical strength of the adhesive film.

The alkyl group-containing (meth)acrylic monomer may further include an unsubstituted $C_{15}$ to $C_{25}$ alkyl group-containing (meth)acrylic acid ester. The unsubstituted $C_{15}$ to $C_{25}$ alkyl group-containing (meth)acrylic acid ester serves to allow the adhesive to have different moduli depending on temperature conditions. In an embodiment, the unsubstituted $C_{15}$ to $C_{25}$ alkyl group-containing (meth)acrylic acid ester may include cetyl (meth)acrylate, stearyl (meth)acrylate, eicosyl (meth)acrylate, and behenyl (meth)acrylate, without being limited thereto. These may be used alone or in combination thereof. Particularly, behenyl (meth)acrylate is preferred according to an embodiment.

The unsubstituted $C_{15}$ to $C_{25}$ alkyl group-containing (meth)acrylic acid ester has a melting temperature of about 30° C. to about 85° C., and, in one embodiment, about 40° C. to about 85° C., and, in one embodiment, about 40° C. to about 60° C. When the adhesive composition includes the unsubstituted $C_{15}$ to $C_{25}$ alkyl group-containing (meth)acrylic acid ester satisfying this melting temperature condition, units derived from unsubstituted $C_{15}$ to $C_{25}$ alkyl group-containing (meth)acrylic acid ester are present in a glass phase at room temperature to allow the adhesive film to maintain high modulus. On the other hand, the unsubstituted $C_{15}$ to $C_{25}$ alkyl group-containing (meth)acrylic acid ester is melted at a higher temperature than the melting temperature and causes rapid decrease in modulus of the adhesive film, thereby enabling effective suppression of stress and panel warpage.

The unsubstituted $C_{15}$ to $C_{25}$ alkyl group-containing (meth)acrylic acid ester may be present in an amount of about 1 mol % to about 20 mol % in the monomer mixture. Within this range, the unsubstituted $C_{15}$ to $C_{25}$ alkyl group-containing (meth)acrylic acid ester can increase mechanical strength of the adhesive film and can prevent or substantially prevent generation of cracks on a protective film during solvent contact and heat treatment in a process of assembling an image display apparatus.

The hydroxyl group-containing (meth)acrylic monomer provides a hydroxyl group to the (meth)acrylic copolymer to react with the curing agent and/or to improve adhesion and durability of the adhesive film. The hydroxyl group-containing (meth)acrylic monomer may be present in an amount of about 0.1 mol % to about 20 mol %, and, in one embodiment, about 0.5 mol % to about 10 mol %, one embodiment, about 1 mol % to about 7.5 mol %, for example, about 0.1 mol %, about 0.5 mol %, about 1.0 mol %, about 1.5 mol %, about 2.0 mol %, about 2.5 mol %, about 3.0 mol %, about 3.5 mol %, about 4.0 mol %, about 4.5 mol %, about 5.0 mol %, about 5.5 mol %, about 6.0 mol %, about 6.5 mol %, about 7.0 mol %, about 7.5 mol %, about 8.0 mol %, about 8.5 mol %, about 9.0 mol %, about 9.5 mol %, about 10.0 mol %, about 10.5 mol %, about 11 mol %, about 11.5 mol %, about 12 mol %, about 12.5 mol %, about 13 mol %, bout 13.5 mol %, about 14 mol %, about 14.5 mol %, about 15 mol %, about 15.5 mol %, about 16 mol %, about 16.5 mol %, about 17 mol %, about 17.5 mol %, about 18 mol %, about 18.5 mol %, about 19 mol %, about 19.5 mol %, or about 20 mol % in the monomer mixture. Within this range, the hydroxyl group-containing (meth)acrylic monomer can improve properties of the adhesive film in terms of adhesion, durability, peelability, and cohesive strength.

The hydroxyl group-containing (meth)acrylic monomer may include at least one of a (meth)acrylic monomer containing a $C_1$ to $C_{20}$ alkyl group having at least one hydroxyl group, a (meth)acrylic monomer containing a $C_3$ to $C_{20}$ cycloalkyl group having at least one hydroxyl group, and a (meth)acrylic monomer containing a $C_6$ to $C_{20}$ having at least one hydroxyl group. In an embodiment, the hydroxyl group-containing (meth)acrylic monomer may include at least one of 2-hydroxyethyl (meth)acrylate, 2-hydroxypropyl (meth)acrylate, 2-hydroxybutyl (meth)acrylate, 4-hydroxybutyl (meth)acrylate, 6-hydroxyhexyl (meth)acrylate, cyclohexanedimethanol mono(meth)acrylate, 1-chloro-2-hydroxypropyl (meth)acrylate, diethylene glycol mono (meth)acrylate, 2-hydroxy-3-phenyloxypropyl (meth)acrylate, 4-hydroxycyclopentyl (meth)acrylate, and 4-hydroxycyclohexyl (meth)acrylate. These may be used alone or in combination thereof.

In the (meth)acrylic copolymer, the alicyclic group-containing (meth)acrylic monomer can improve pencil hardness of a polarizing plate on the adhesive film for polarizing plates. In an embodiment, a polarizing plate to which the adhesive film for polarizing plates is attached may have a pencil hardness of about 2H or more, and, in one embodiment, about 2H to about 3H, as measured on the adhesive film. The polarizing plate to which a typical adhesive film is attached has a pencil hardness of about 4B to about H, as measured on the typical adhesive film. Within this range, the polarizing plate does not exhibit significant reduction in pencil hardness when attached to a liquid crystal panel including a glass material via the adhesive film for polarizing plates, as compared with the case where the polarizing plate is attached to a liquid crystal panel formed of a glass material without the adhesive film, whereby the polarizing plate can be used in an optical display.

Further, the alicyclic group-containing (meth)acrylic monomer may be included together with the hetero-alicyclic group-containing (meth)acrylic monomer in the (meth) acrylic copolymer to reduce creep at 25° C. while increasing creep at 85° C. In an embodiment, each of the alicyclic group-containing (meth)acrylic monomer and the hetero-alicyclic group-containing (meth)acrylic monomer has a glass transition temperature of about 5° C. or higher, and, in one embodiment, about 10° C. to about 200° C. when present as a homopolymer, thereby reducing creep at 25° C. while increasing creep at 85° C. The alicyclic group-containing (meth)acrylic monomer and the hetero-alicyclic group-containing (meth)acrylic monomer may be present in a mole ratio of about 1:0.5 to about 1:40, and, in one embodiment, about 1:0.5 to about 1:20, in the monomer mixture. Within this range, the polarizing plate on the adhesive film can have high pencil hardness.

The alicyclic group-containing (meth)acrylic monomer may be present in an amount of about 1 mol % to about 30 mol %, and, in one embodiment, about 5 mol % to about 25 mol %, for example, about 1 mol %, about 5 mol %, about 10 mol %, about 15 mol %, about 20 mol %, about 25 mol %, or about 30 mol %, in the monomer mixture. Within this range, the alicyclic group-containing (meth)acrylic monomer can increase pencil hardness of the polarizing plate on the adhesive film while improving reliability.

The alicyclic group-containing (meth)acrylic monomer may include a substituted or unsubstituted $C_5$ to $C_{20}$ monocyclic or heterocyclic alicyclic group-containing (meth) acrylic acid ester. Herein, "substituted" in "substituted or unsubstituted" means that at least one hydrogen atom is substituted with a $C_1$ to $C_{10}$ alkyl group, a $C_3$ to $C_{10}$ acyclic group, a $C_5$ to $C_{20}$ aromatic group, a halogen, or a nitro group. The "alicyclic group" means a non-hetero-alicyclic group which does not contain a hetero atom of nitrogen, oxygen, or sulfur. The term "heterocyclic" means that two or more alicyclic groups are connected to each other while sharing at least one carbon atom. In an embodiment, the substituted or unsubstituted $C_5$ to $C_{20}$ monocyclic or heterocyclic alicyclic group-containing (meth)acrylic acid ester may include cyclohexyl (meth)acrylate, isobornyl (meth) acrylate, dicyclopentanyl (meth)acrylate, methylcyclohexyl (meth)acrylate, and/or dicyclopentenyl (meth)acrylate. These may be used alone or in combination thereof.

In the (meth)acrylic copolymer, the hetero-alicyclic group-containing (meth)acrylic monomer is coupled to the cellulose ester binder, thereby improving modulus of the adhesive film. Further, the hetero-alicyclic group-containing (meth)acrylic monomer can reduce creep at 25° C. while increasing creep at 85° C. together with the alicyclic group-containing (meth)acrylic monomer.

The hetero-alicyclic group-containing (meth)acrylic monomer may be present in an amount of about 1 mol %, to about 20 mol % and, in one embodiment, about 5 mol % to about 10 mol %, for example, about 1 mol %, about 5 mol %, about 10 mol %, about 15 mol %, or about 20 mol %, in the monomer mixture. Within this range, the hetero-alicyclic group-containing (meth)acrylic monomer can increase modulus of the adhesive film at 30° C. while improving reliability of the adhesive film.

The hetero-alicyclic group-containing (meth)acrylic monomer may include a (meth)acrylic acid ester containing a $C_4$ to $C_9$ hetero-alicyclic group having at least one of nitrogen, oxygen, and sulfur. In an embodiment, the hetero-alicyclic group-containing (meth)acrylic monomer may include (meth)acryloyl morpholine, without being limited thereto.

The monomer mixture may further include other monomers including at least one of a $C_1$ to $C_3$ alkyl group-containing (meth)acrylic acid ester, an amide group-containing monomer, and an aromatic group-containing monomer. In an embodiment, the other monomers may include methyl (meth)acrylate, (meth)acryl amide, benzyl (meth)acrylate, phenoxy ethyl (meth)acrylate, and/or styrene, without being limited thereto.

The (meth)acrylic copolymer may be prepared by typical polymerization of the monomer mixture. Polymerization of the monomer mixture may be performed by a typical method known in the art. For example, the (meth)acrylic copolymer may be prepared by adding an initiator to the monomer mixture, followed by typical polymerization of the monomer mixture, for example, suspension polymerization, emulsion polymerization, solution polymerization, and the like. Here, the polymerization may be performed at about 65° C. to about 70° C. for about 6 hours to about 8 hours. As the initiator, any typical initiator including azo-based polymerization initiators and/or peroxide polymerization initiators such as benzoyl peroxide or acetyl peroxide may be used.

The (meth)acrylic copolymer may have a weight average molecule weight (Mw) of about 2,000,000 g/mol or less, and, in one embodiment, about 200,000 g/mol to about 1,500,000 g/mol, and, in one embodiment, about 200,000 g/mol to about 1,300,000 g/mol, for example, about 200,000 g/mol, about 300,000 g/mol, about 400,000 g/mol, about 500,000 g/mol, about 600,000 g/mol, about 700,000 g/mol, about 800,000 g/mol, about 900,000 g/mol, about 1,000,000 g/mol, about 1,100,000 g/mol, about 1,200,000 g/mol, about 1,300,000 g/mol, about 1,400,000 g/mol, or about 1,500,000 g/mol. Within this range, the (meth)acrylic copolymer can secure high durability of the adhesive film. The weight average molecular weight can be measured by gel permeation chromatography with a polystyrene standard. The (meth)acrylic copolymer may have a glass transition temperature of about −100° C. to about 0° C., and, in one embodiments, about −80° C. to about −5° C. Within this range, the (meth)acrylic copolymer can provide flowability to the adhesive film used as an adhesive while securing durability of the adhesive film. The (meth)acrylic copolymer may have a polydispersion index of about 2.5 to about 9.0, and, in one embodiment, about 3 to about 6. Within this range, the (meth)acrylic copolymer allows stable polymerization while preventing or substantially preventing deterioration in durability. The (meth)acrylic copolymer may have an acid value of about 5.0 mgKOH/g or less, and, in one embodiment, about 0.01 mgKOH/g to about 3 mgKOH/g. Within this range, the (meth)acrylic copolymer can directly or indirectly suppress corrosion of an adherend.

The curing agent reacts with the (meth)acrylic copolymer to form an adhesive film while providing adhesion thereto. The curing agent may include at least one selected from among an isocyanate curing agent, a metal chelate curing agent, an epoxy curing agent, an aziridine curing agent, and a carbodiimide curing agent. In an embodiment, the curing agent may include at least one of the isocyanate curing agent, the metal chelate curing agent, and the aziridine curing agent to reduce aging time at room temperature while improving reliability.

The isocyanate curing agent may include a bi- or higher functional, for example, bi- to hexa-functional isocyanate curing agent. In an embodiment, the isocyanate curing agent may include at least one selected from among trifunctional isocyanate curing agents including trifunctional trimethylolpropane-modified toluene diisocyanate adducts, trifunctional toluenediisocyanate trimers, and trimethylolpropane-modified xylene diisocyanate adducts, hexafunctional trimethylolpropane-modified toluene diisocyanates, and hexafunctional isocyanurate-modified toluenediisocyanate. These may be used alone or in combination thereof.

The metal chelate curing agent may include coordination compounds to which a polyvalent metal such as aluminum is coordinately bonded. For example, the metal chelate curing agent may include aluminum-based chelate compounds such as tris(ethyl acetoacetate)aluminum, ethylacetoacetate aluminum diisopropylate, and/or tris(acetyl acetonate)aluminum.

The aziridine curing agent may include a bifunctional aziridine curing agent such as N,N'-hexane-1,6-diylbis(2-methylaziridine-1-carboxamide), N,N'-diphenylmethane-4,4'-bis(1-aziridinecarboxamide), and the like.

The curing agent, that is, in one embodiment, a mixture including at least one of the isocyanate curing agent, the metal chelate curing agent, and the aziridine curing agent may be present in an amount of about 0.01 parts by weight to about 10 parts by weight, for example, about 0.01 parts by weight to about 5 parts by weight, about 0.05 parts by weight to about 5 parts by weight, or about 0.1 parts by weight to about 0.7 parts by weight, relative to 100 parts by weight of the (meth)acrylic copolymer. Within this range, the curing agent can improve reliability of the adhesive film while reducing creep at room temperature.

In one embodiment, the curing agent may include the isocyanate curing agent alone, a mixture of the isocyanate curing agent and the metal chelate curing agent, or a mixture of the isocyanate curing agent and the aziridine curing agent. These mixtures can further increase modulus of the adhesive film at room temperature. In the mixture of the isocyanate curing agent and the metal chelate curing agent, the isocyanate curing agent and the metal chelate curing agent may be present in a weight ratio of about 1:0.1 to 1:10, and, in one embodiment, about 1:0.1 to about 1:5, and, in one embodiment, about 1:1.5 to about 1:5 in order to realize the above effects. In the mixture of the isocyanate curing agent and the aziridine curing agent, the isocyanate curing agent and the aziridine curing agent may be present in a weight ratio of about 1:0.1 to about 1:10, and, in one embodiment, about 1:0.1 to about 1:5, and, in one embodiment, about 1:1.5 to about 1:5 in order to realize the above effects.

The cellulose ester binder is coupled to the heteroalicyclic group of the meth)acrylic copolymer and increases the modulus of the adhesive film at 30° C. In addition, the cellulose ester binder can reduce creep at 25° C. while improving durability of the adhesive film (under thermal impact or under heat resistance/moisture resistance conditions).

The cellulose ester binder may include a binder in which —OH of cellulose or —OH of —$CH_2$—OH is partially converted into at least one —O—(C=O)—R. Here, R may be a $C_1$ to $C_{10}$ alkyl group, for example, a methyl group, an ethyl group, or a butyl group. The cellulose ester binder may include homogeneous or heterogeneous —O—(C=O)—R. In an embodiment, the cellulose ester binder may include at least one of cellulose acetate butyrate, cellulose acetate propionate, cellulose acetate, and cellulose propionate.

The cellulose ester binder may be present in an amount of about 0.1 parts by weight to about 30 parts by weight, and, in one embodiment, about 5 parts by weight to about 20 parts by weight, for example, about 1 part by weight, about 5 parts by weight, about 10 parts by weight, about 15 parts by weight, about 20 parts by weight, about 25 parts by weight, or about 30 parts by weight, relative to 100 parts by weight of the meth)acrylic copolymer. Within this range, the cellulose ester binder can increase the modulus of the adhesive film at 30° C. and reduce creep at 25° C. while improving durability of the adhesive film (under thermal impact or under heat resistance/moisture resistance conditions).

The adhesive composition may further include a silane coupling agent. The silane coupling agent can further improve adhesion of the adhesive film to an adherend (for example, a glass plate).

The silane coupling agent may be a typical silane coupling agent known to those skilled in the art. For example, the silane coupling agent may include at least one selected from the group consisting of epoxylated silicon compounds, such as 3-glycidoxypropyltrimethoxysilane, 3-glycidoxypropylmethyldimethoxysilane, and 2-(3,4-epoxycyclohexyl)ethyltrimethoxysilane; polymerizable unsaturated group-containing silicon compounds, such as vinyltrimethoxysilane, vinyltriethoxysilane, and (meth)acryloxypropyltrimethoxysilane; amino group-containing silicon compounds, such as 3-aminopropyltrimethoxysilane, N-(2-aminoethyl)-3-aminopropyltrimethoxysilane, and N-(2-aminoethyl)-3-aminopropylmethyldimethoxysilane; and 3-chloropropyltrimethoxysilane, without being limited thereto.

The silane coupling agent may be present in an amount of about 0.01 parts by weight to about 5 parts by weight, and, in one embodiment, about 0.01 parts by weight to about 1 part by weight, relative to 100 parts by weight of the (meth)acrylic copolymer. Within this range, the silane coupling agent can secure good durability of the adhesive film while suppressing variation in components and properties over time.

The adhesive composition may further include a curing accelerator. The curing accelerator promotes curing reaction between the (meth)acrylic copolymer and the curing agent to reduce a curing speed. The curing accelerator may include at least one selected from among organic metal catalysts, and, in one embodiment, tin-containing catalysts, for example, dibutyltin dilaurate, dibutyltin diacetate, dibutyltin diacetylacetonate, tetrabutyltin, trimethyltin hydroxide. The curing accelerator may include a tertiary amine catalyst, specifically at least one of triethanolamine and trialkylamine.

The curing accelerator may be present in an amount of about 0.1 parts by weight to about 5 parts by weight relative to 100 parts by weight of the (meth)acrylic copolymer. Within this range, the curing accelerator can increase the curing speed while preventing or substantially preventing deterioration in transparency of the adhesive film caused by remaining curing accelerator.

The adhesive composition may further include typical additives. The additives may include an antistatic agent, a UV absorbent an antioxidant, an adhesion imparting resin, a plasticizer, a reworking agent, and/or the like. In an embodiment, the reworking agent may include a polysiloxane oligomer or a mixture including the same. The additives may be present in an amount of about 0.001 parts by weight to about 5 parts by weight and, in one embodiment, about 0.01 parts by weight to about 1 part by weight, relative to 100 parts by weight of the (meth)acrylic copolymer. Within this range, the additives can provide inherent effects thereof without affecting properties of the adhesive film for polarizing plates.

The adhesive composition for polarizing plates may have a viscosity of about 1,000 cPs to about 4,000 cPs at 25° C. Within this range, the adhesive composition can facilitate thickness adjustment of the adhesive film, can form an adhesive film without generating spots, and can provide a uniform coating surface.

Next, an adhesive film for polarizing plates according to another embodiment of the present invention and an adhesive composition for the adhesive film according to this embodiment will be described.

The adhesive film according to this embodiment includes: a (meth)acrylic copolymer, which includes an alkyl group, a hydroxyl group, an alicyclic group, a hetero-alicyclic group, and a tertiary amine group; and a cellulose ester binder. The adhesive film according to this embodiment is substantially the same as the adhesive film according to the above-described embodiment except that the (meth)acrylic copolymer further includes the tertiary amine group. As the (meth)acrylic copolymer further includes the tertiary amine group, it is possible to increase an aging speed of the adhesive composition or a dried product thereof. Thus, the following description will focus on the (meth)acrylic copolymer which includes the alkyl group, the hydroxyl group, the alicyclic group, the hetero-alicyclic group, and the tertiary amine group.

The (meth)acrylic copolymer, which includes the alkyl group, the hydroxyl group, the alicyclic group, the hetero-alicyclic group, and the tertiary amine group may be a copolymer of a monomer mixture including an alkyl group-containing (meth)acrylic monomer, a hydroxyl group-containing (meth)acrylic monomer, an alicyclic group-containing (meth)acrylic monomer, a hetero-alicyclic group-containing (meth)acrylic monomer, and a tertiary amine group-containing (meth)acrylic monomer.

According to an embodiment, the alkyl group-containing (meth)acrylic monomer, the hydroxyl group-containing (meth)acrylic monomer, the alicyclic group-containing (meth)acrylic monomer, and the hetero-alicyclic, group-containing (meth)acrylic monomer are the same as those described above.

The tertiary amine group-containing (meth)acrylic monomer may include a dialkylaminoalkyl (meth)acrylic acid ester. In an embodiment, the dialkylaminoalkyl(meth)acrylic acid ester may include at least one of dimethylaminoethyl (meth)acrylate, dimethylaminopropyl (meth)acrylate, dimethylaminobutyl (meth)acrylate, diethylaminoethyl (meth) acrylate, diethylaminopropyl (meth)acrylate, diethylaminobutyl (meth)acrylate, and dibutylaminoethyl (meth) acrylate.

The tertiary amine group-containing (meth)acrylic monomer may be present in an amount of about 0.001 mol % to about 15 mol %, and, in one embodiment, about 0.01 mol % to about 10 mol %, for example, about 0.01 mol %, about 0.05 mol %, about 0.1 mol %, about 0.2 mol %, about 0.3 mol %, about 0.4 mol %, about 0.5 mol %, about 0.6 mol %, about 0.7 mol %, about 0.8 mol %, about 0.9 mol %, about 1.0 mol %, about 2.0 mol %, about 3.0 mol %, about 4.0 mol %, about 5.0 mol %, about 6.0 mol %, about 7.0 mol %, about 8.0 mol %, about 9.0 mol %, about 10.0 mol %, about 11.0 mol %, about 12.0 mol %, about 13.0 mol %, about 14.0 mol %, or about 15.0 mol % in the monomer mixture. Within this range, the tertiary amine group-containing (meth)acrylic monomer can increase an aging speed of the adhesive composition or a dried product thereof at room temperature while promoting curing reaction.

In an embodiment, the monomer mixture may include about 40 mol % to bout 95 mol % of the alkyl group-containing (meth)acrylic monomer, about 0.1 mol % to about 20 mol % of the hydroxyl group-containing (meth) acrylic monomer, about 1 mol % to about 30 mol % of the alicyclic group-containing (meth)acrylic monomer, about 1 mol % to about 20 mol % of the hetero-alicyclic group-containing (meth)acrylic monomer, and about 0.001 mol % to bout 15 mol % of the tertiary amine group-containing (meth)acrylic monomer.

Next, an adhesive film for polarizing plates according to another embodiment of the present invention and an adhesive composition for the adhesive film according to this embodiment will be described. The adhesive film according to this embodiment may include: a (meth)acrylic copolymer, which includes an alkyl group, a hydroxyl group, an alicyclic group, a hetero-alicyclic group, a tertiary amine group, and a carboxylic acid group; and a cellulose ester binder. The adhesive film according to this embodiment is substantially the same as the adhesive film according to the above described embodiment except that the (meth)acrylic copolymer further includes the tertiary amine group and the carboxylic acid group. The carboxylic acid group-containing monomer may be (meth)acrylic acid and the like, and may be present in an amount of about 0.001 mol % to about 10 mol %, and, in one embodiment, about 0.001 mol % to about 5 mol %, and, in one embodiment, about 0.01 mol % to about 3 mol %, in the monomer mixture. Within this range of the carboxylic acid group-containing monomer, the (meth)acrylic copolymer can increase the modulus of the adhesive film at room temperature without corrosion of metal. In one embodiment, the monomer mixture may include about 40 mol % to about 95 mol % of the alkyl group-containing (meth)acrylic monomer, about 0.1 mol % to about 20 mol % of the hydroxyl group-containing (meth) acrylic monomer, about 1 mol % to about 30 mol % of the alicyclic group-containing (meth)acrylic monomer, about 1 mol % to about 20 mol % or the hetero-alicyclic group-containing (meth)acrylic monomer, about 0.001 mol % to about 15 mol % of the tertiary amine group-containing (meth)acrylic monomer, and about 0.001 mol % to about 10 mol % of the carboxylic acid group-containing (meth)acrylic monomer in the monomer mixture.

Next, a polarizing plate according to an embodiment of the present invention will be described.

The polarizing plate according to an embodiment of the present invention may include the adhesive film according to an embodiment of the present invention. The polarizing plate according to the present invention may be produced by attaching the adhesive film to one surface of the polarizing plate or by coating the adhesive composition according to an embodiment to a thickness (e.g., a predetermined thickness) on a surface of the polarizing plate.

The polarizing plate according to an embodiment of the present invention includes the adhesive film according to an embodiment and thus can have a pencil hardness of about 2H or more, and, in one embodiment, about 2H to about 3H, as measured on the adhesive film. Within this range, the polarizing plate does not exhibit significant reduction in pencil hardness when attached to a liquid crystal panel including a glass material via the adhesive film for polarizing plates, as compared with the case where the polarizing plate attached to a liquid crystal panel formed of a glass material without the adhesive film, whereby the polarizing plate can used in an optical display.

The polarizing plate may include a polarizer and an optical film formed on at least one surface of the polarizer. The polarizer and the optical film may be selected from any polarizers and optical films known to those skilled in the art.

The polarizing plate may have a thickness of about 30 μm to about 200 μm, and, in one embodiment, about 50 μm to about 100 μm. Within this range, the polarizing, plate can be used in an optical display.

FIG. 2 is a cross-sectional view of a polarizing plate according to am embodiment of the present invention. Referring to FIG. 2, a polarizing plate 100 according to an embodiment includes a polarizer 110, a first optical film 120 formed on an upper surface of the polarizer 110, and an adhesive film 130 formed on a lower surface of the polarizer 110, wherein the adhesive film 130 may include the adhesive film for polarizing plates according to an embodiment of the present invention. Although not shown in FIG. 2, the adhesive film 130 may be attached to a liquid crystal display panel.

The polarizer 110 may be formed of any polyvinyl alcohol film without being limited to a particular production method. For example, the polarizer may be produced using a modified polyvinyl alcohol film, such as a partially formalized polyvinyl alcohol film, an acetoacetyl group-modified polyvinyl alcohol film, and/or the like. In an embodiment, the polarizer is produced by dyeing a polyvinyl alcohol film with iodine or dichroic dyes, followed by stretching the polyvinyl alcohol film in a certain direction. Specifically, the polarizer is produced through swelling, dyeing, and stretching processes. A method of performing each of the processes is generally known to those skilled in the art. The polarizer 110 may have a thickness of about 5 μm to about 50 μm. Within this range, the polarizer 110 can be used in optical displays.

The first optical film 120 may be formed of an optically transparent resin, such as at least one of cyclic polyolefin including amorphous cyclic olefin polymer (COP) and the like, poly(meth)acrylate, polycarbonate, polyester including polyethylene terephthalate (PET) and the like, cellulose ester including triacetylcellulose (TAC) and the like, polyethersulfone, polysulfone, polyamide, polyimide, polyolefin, polyarylate, polyvinyl alcohol, polyvinyl chloride, and polyvinylidene chloride resins. The first optical film 120 may have a thickness of about 10 μm to about 200 μm, for example, about 20 μm to about 120 μm. Within this range, the first optical film 120 can be used in an optical display.

FIG. 3 is a cross-sectional view of a polarizing plate according to another embodiment of the present invention. Referring to FIG. 3, a polarizing plate 200 according to another embodiment may include the polarizer 110, the first optical film 120 formed on an upper surface of the polarizer 110, a second optical film 140 formed on a lower surface of the polarizer 110, and the adhesive film 130 formed on a lower surface of the second optical film 140, wherein the adhesive film 130 may include the adhesive film for polarizing plates according to an embodiment of the present invention. The polarizing plate 200 is substantially the same as the polarizing plate 100 according to the above-described embodiment except that the second optical film 140 is further formed between the polarizer 110 and the adhesive film 130. The second optical film 140 may be formed of a resin which is the same as or different from that of the first optical film 120. The second optical film 140 may have a thickness which is equal to or different from that of the first optical film 120.

Although not shown in FIGS. 2 and 3, a bonding layer formed of a bonding agent for polarizing plates may be included between the polarizer and the first optical film and/or between the polarizer and the second optical film. The bonding agent may include water-based, pressure-sensitive, and/or UV curable bonding agents.

An optical display according to an embodiment may include the polarizing plate according to the present invention. For example, the optical display may include a liquid crystal display and an organic light emitting display, without being limited thereto.

FIG. 4 is a cross-sectional view of a liquid crystal display according to an embodiment of the present invention. Referring to FIG. 4, a liquid crystal display 300 according to an embodiment may include a liquid crystal display panel 310, a first polarizing plate 320 formed on an upper surface of the liquid crystal display panel 310, a second polarizing plate 330 formed on a lower surface of the liquid crystal display panel 310, and a backlight unit 40 under the second polarizing plate 330, wherein at least one of the first and second polarizing plates 320 and 330 may include the polarizing plate according to an embodiment of the present invention.

The liquid crystal display panel may employ an in-plane switching (IPS) mode, a plane-to-line switching (PLS) mode, a twisted nematic (TN) mode, a vertical alignment (VA) mode, a patterned vertical alignment (PVA) mode, or a super-patterned vertical alignment (S-PVA) mode. In particular, a liquid crystal display panel of the PLS mode can have an excellent effect in prevention of light leakage.

Next, the present invention will be described in further detail with reference to some examples. It should be understood that these examples are provided for illustration only and are not to be construed in any way as limiting the present invention.

Details of components used in Examples and Comparative Examples are as follows.

(A) (Meth)acrylic copolymer: (Meth)acrylic copolymer prepared in Preparative Examples (B) Curing agent (B1) Isocyanate curing agent: Trimethylolpropane (TMP)-modified toluene diisocyanate adduct (L-45, Soken, solid content: 45 wt % in toluene)

(B2) Metal chelate curing agent: Aluminum chelate (BXX 4805, Solid content: about 3 wt %, Toyo Ink., Japan)

(B3) Aziridine curing agent: N,N'-hexane-1,6-diylbis(2-methylaziridine-1-carboxamide) (PZH-100, Solid content: 0.5 wt % in methylethylketone Menadina, Spain)

(C) Cellulose ester binder: cellulose acetate butyrate (CAB-381-0.5, Eastman)

(D) Silane coupling agent: (A-50, Soken)

(E) Crosslinking accelerator: tin catalyst (S accelerator, Soken).

Preparative Example 1: Preparation of (Meth)Acrylic Copolymer

Methylethylketone was added to a 1 L reactor equipped with a cooler for temperature regulation and kept under a nitrogen atmosphere. 100 mol % of a monomer mixture comprising 79.45 mol % of n-butyl acrylate, 10 mol % of acryloyl morpholine, 5 mol % of isobornyl acrylate, 5 mol % of 4-hydroxybutyl acrylate, 0.05 mol % of dimethylaminoethyl acrylate, and 0.5 mol % of acrylic acid was added to the reactor. Then, nitrogen gas was supplied to the reactor for 30 minutes to remove oxygen from the monomer mixture, and the inner temperature of the reactor was maintained at 65° C. After uniformly stirring the monomer mixture, an initiator V601 (Wako) was added to the monomer mixture in an amount of 0.5 g relative to 1,000 g of the monomer mixture, followed by reaction for 4 hours. The inner temperature of the reactor was increased to 70° C., followed by further adding the initiator V601 (Wako) until the total amount of the initiator reached the value as listed in Table 1. The monomer was left for reaction at 71° C. for 2 hours and cooled, thereby preparing a (meth)acrylic copolymer.

Preparative Example 2 to 10: Preparation of (Meth)Acrylic Copolymer

Each of (meth)acrylic copolymers was prepared in the same manner as in Preparative Example 1 except that the kind and amount of monomers of the monomer mixture and the amount of the initiator were changed as listed in Table 1.

Example 1

An adhesive composition for polarizing plates was prepared by mixing 100 parts by weight of the (meth)acrylic copolymer (A) prepared in Preparative Example 1, 0.2 parts by weight of the isocyanate curing agent (B1), 0.5 parts by weight of the metal chelate curing agent (B2), 10 parts by weight of the cellulose ester binder (C), 0.06 parts by weight of the silane coupling agent (D), and 0.2 parts by weight of the crosslinking accelerator (E).

The adhesive composition was coated on a polyethylene terephthalate release film and dried at 105° C. for 4 minutes, thereby preparing a 20 μm thick adhesive sheet.

A polyvinyl alcohol film was stretched to three times an initial length thereof at 60° C., dyed with iodine, and further stretched to 2.5 times in a boric acid solution at 40° C., thereby preparing a polarizer. Triacetylcellulose films were bonded to both surfaces of the polarizer via a bonding agent (Z-200, Nippon Goshei), thereby preparing a polarizing plate.

The adhesive sheet was attached to one surface of one of the triacetylcellulose films and left under constant temperature/humidity conditions (35° C., 45% RELATIVE HUMIDITY) for 24 hours, thereby preparing a polarizing plate including the adhesive film.

Examples 2 to 9

Each of adhesive compositions for polarizing plates was prepared in the same manner as in Example 1 except for the kind of (meth)acrylic copolymer and amounts of the curing agent and the cellulose ester binder.

Adhesive sheets and adhesive films for polarizing plates were prepared in the same manner as in Example 1 using the prepared adhesive composition.

Comparative Examples 1 to 3

Each of adhesive compositions for polarizing plates was prepared in the same manner as in Example 1 except for the

TABLE 1

| | BA (mol %) | ACMO (mol %) | IBXA (mol %) | 4-HBA (mol %) | DMAEA (mol %) | AAc (mol %) | Initiator, g per 1,000 g total monomer | Mw (g/mol) | Tg (° C.) |
|---|---|---|---|---|---|---|---|---|---|
| Preparative Example 1 | 79.45 | 10 | 5 | 5 | 0.05 | 0.5 | 0.6 | 489,900 | −26.2 |
| Preparative Example 2 | 74.45 | 10 | 10 | 5 | 0.05 | 0.5 | 0.6 | 465,500 | −19.7 |
| Preparative Example 3 | 69.45 | 10 | 15 | 5 | 0.05 | 0.5 | 0.6 | 453,000 | −15.2 |
| Preparative Example 4 | 64.45 | 10 | 20 | 5 | 0.05 | 0.5 | 0.6 | 441,200 | −8.4 |
| Preparative Example 5 | 70 | 10 | 15 | 5 | — | — | 0.5 | 520,800 | −15.7 |
| Preparative Example 6 | 70 | 10 | 15 | 5 | — | — | 0.4 | 865,500 | −16.0 |
| Preparative Example 7 | 69.45 | 10 | 15 | 5 | 0.05 | 0.5 | 0.2 | 1,299,500 | −15.6 |
| Preparative Example 8 | 69.95 | 10 | 15 | 5 | 0.05 | — | 0.4 | 864,200 | −15.9 |
| Preparative Example 9 | 80 | — | 15 | 5 | — | — | 0.3 | 1,057,300 | −28.6 |
| Preparative Example 10 | 94.95 | — | — | 5 | 0.05 | — | 0.3 | 1,002,500 | −41.0 |

* BA: n-butyl acrylate, ACMO: acryloyl morpholine, IBXA: isobornyl acrylate, 4-HBA: 4-hydroxybutyl acrylate, DMAEA: dimethylaminoethyl acrylate, AAc: acrylic acid, Mw: weight average molecular weight of (meth)acrylic copolymer, Tg: glass transition temperature of (meth)acrylic copolymer.

kind of (meth)acrylic copolymer and amounts of the curing agent and the cellulose ester binder. Adhesive sheets and adhesive films for polarizing plates were prepared in the same manner as in Example 1 using the prepared adhesive composition.

Components of the adhesive compositions prepared in Examples and Comparative Examples are shown in Table 2.

TABLE 2

|  | (A) (Structure) | (A) (parts by weight) | (B1) (parts by weight) | (B2) (parts by weight) | (B3) (parts by weight) | (C) (parts by weight) |
|---|---|---|---|---|---|---|
| Example 1 | Preparative Example 1 | 100 | 0.2 | 0.5 | — | 10 |
| Example 2 | Preparative Example 2 | 100 | 0.2 | 0.5 | — | 10 |
| Example 3 | Preparative Example 3 | 100 | 0.2 | 0.5 | — | 10 |
| Example 4 | Preparative Example 4 | 100 | 0.2 | 0.5 | — | 10 |
| Example 5 | Preparative Example 5 | 100 | 0.2 | — | — | 10 |
| Example 6 | Preparative Example 6 | 100 | 0.2 | — | — | 10 |
| Example 7 | Preparative Example 7 | 100 | 0.2 | 0.5 | — | 10 |
| Example 8 | Preparative Example 8 | 100 | 0.2 | 0.5 | — | 10 |
| Example 9 | Preparative Example 3 | 100 | 0.2 | — | 0.5 | 10 |
| Comparative Example 1 | Preparative Example 3 | 100 | 0.2 | — | — | — |
| Comparative Example 2 | Preparative Example 9 | 100 | 0.2 | — | — | — |
| Comparative Example 3 | Preparative Example 10 | 100 | 0.2 | 0.5 | — | 10 |

The adhesive films for polarizing plates and the polarizing plate prepared in Examples and Comparative Examples were evaluated as to the following properties. Results are shown in Table 3.

(1) Creep: Creep of an adhesive film was measured using Texture Analyzer TA.XT Plus (load cell 5 kg, EKO Instruments). The adhesive film was obtained by aging each of the adhesive sheets of Examples and Comparative Examples under conditions of 35° C. and 45% RELATIVE HUMIDITY for 48 hours.

Referring to FIGS. 1A and 1B the specimen 23 for measurement of creep was prepared by attaching a 20 μm thick adhesive film 21 to the polarizing plate 22. The polarizing plate 22 includes a 40 μm thick triacetylcellulose film, an 8 μm thick polarizer, and a 40 μm thick triacetylcellulose film stacked in the stated order. The specimen was attached in an area of a×b (for example, 15 mm×15 mm) to a distal end of the alkali-free glass plate 20 and pulled by the weight W for 1,000 seconds, followed by measuring a pushed distance of the specimen 23 from the glass plate 20. The weight W was 2,250 g at a creep measurement temperature of 25° C. and 1,500 g at a creep measurement temperature of 85° C.

(2) Storage modulus: A 20 μm thick adhesive film was prepared by aging each of the adhesive sheets prepared in Examples and Comparative Examples under conditions of 35° C. and 45% RELATIVE HUMIDITY for 48 hours. After removal of a release film from each of the adhesive films, plural adhesive films were stacked and cut into a circular specimen having a thickness of 500 μm and a diameter of 8 mm. Then, storage moduli of the specimen at 30° C. and 120° C. were measured under conditions of a strain of 5%, an angular frequency (ω) of 10 rad/sec and a normal force of 1.5 N using a Physica MCR501 (Anton Paar Co., Ltd.) while heating the specimen on a 8 mm-diameter disc from 0° C. to 150° C. at 10° C./min.

(3) Pencil hardness of polarizing plate on adhesive film: An adhesive film was placed on a glass plate typically used in measurement of pencil hardness, and a polarizing plate was placed on the adhesive film, followed by measuring pencil hardness of the polarizing plate using a pencil hardness tester (Heidon) in accordance with JIS K5400.

Pencil hardness of the polarizing plate on the adhesive film was measured using a specimen prepared by sequentially stacking the adhesive film, a triacetylcellulose film (thickness: 40 μm, N-TAC, KONICA MINOLTA), a polarizer (thickness: 8 μm), and a triacetylcellulose film (thickness: 40 μm, N-TAC, KONICA MINOLTA). The adhesive film of the specimen was attached to a glass plate to secure the specimen to the glass plate, followed by autoclaving under conditions of 5 atm and 50° C. for 1,000 seconds. Before measurement of pencil hardness, the specimen was left at 23° C. and 55% RELATIVE HUMIDITY for 24 hours. Pencil hardness was measured on the surface of the triacetylcellulose film using a Coretech pencil hardness meter (Coretech Korea). Specifically, pencil hardness was measured under conditions of a pencil weight of 500 g and a scratch speed of 48 mm/min on the triacetylcellulose film. Upon testing five times using the same pencil, a pencil hardness value allowing no scratch to be observed all five times was taken as the maximum pencil hardness of the polarizing plate.

(4) Durability: Each of the adhesive sheets prepared in Examples and Comparative Examples was left under conditions of 35° C. and 45% RELATIVE HUMIDITY for 24 hours. A polyvinyl alcohol film was stretched to three times an initial length thereof at 60° C. dyed with iodine, and further stretched to 2.5 times in a boric acid solution at 40° C., thereby preparing a polarizer. Then, triacetylcellulose films were bonded to both surfaces of the polarizer, thereby preparing a polarizing plate. The adhesive film was attached to the polarizing plate, which in turn was cut into a rectangular specimen having a size of 150 mm×100 mm (length× width) thereby preparing a polarizing plate for measurement of durability. The polarizing plate was attached to an alkali-free glass plate having the same size and subjected to autoclaving at 50° C. for 1,000 seconds, thereby preparing a specimen in which the polarizing plate is stacked on the glass plate. Durability was performed by subjecting the specimen to 200 cycles of thermal impact testing (1 cycle referring to an operation of leaving the specimen at 85° C. for 500 hours or at −40° C. for 30 hours and then leaving at 85° C. for 30 minutes, or by leaving the specimen at 60° C. and 95% RELATIVE HUMIDITY for 500 hours.

◯: No detachment, no dragging, Or no bubble generation

Figure 5:
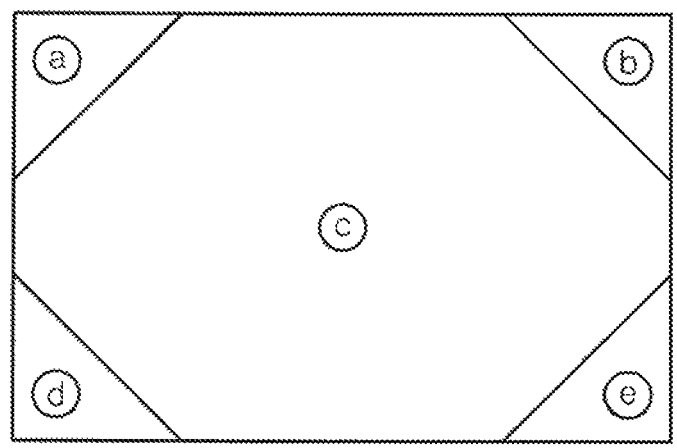
FIG. 5 is a top view of a specimen for evaluation of light leakage.

Δ: At least one of minute detachment, minute dragging, or minute bubble generation x: Severe detachment, severe dragging, and severe bubble generation (5) Light leakage: Light leakage was measured using a specimen prepared in the same manner as in (1) and including the polarizing plate attached to the adhesive film for polarizing plates. The specimens were stacked on both surfaces of a glass plate such that light absorption axes of polarizers were orthogonal to each other. The specimens were held at 85° C. for 500 hours and at 25° C. for 2 hours. After operating a PLS mode LCD using the specimens, brightness at the front side of the display panel was measured from a height of 1 m using a brightness tester (RISA, Hiland Co., Ltd.). Specifically, brightness c at the central region of the panel and brightness a, b, d and e at corners of the panel at which light leakage occurred were measured. As shown in FIG. 5, brightness measuring points were placed near four corners of the panel, respectively. Here, a circle for brightness measurement at each corner had a radius of 0.5 cm. In FIG. 5, ⓐ, ⓑ, ⓒ, ⓓ and ⓔ indicate the brightness measuring points. The degree of light leakage (ΔL) was quantified according to the following Equation 2. A lower ΔL value in better light leakage characteristics, which are evaluated according to the following criteria.

$$\Delta L = |[(a+b+d+e)/4]/c - 1|$$ Equation 2 where a b, d and e represent brightness values measured at brightness measurement points ⓐ, ⓑ, ⓒ, ⓓ and ⓔ (high brightness areas) in FIG. 5, respectively, and c is a brightness value at the central brightness measuring point ⓒ (low brightness area) in FIG. 5.

◯: No light leakage, 0≤ΔL≤0.1.

Δ: Slight light leakage, 0.1<ΔL<0.3.

x: Severe light leakage, 0.3≤ΔL.

TABLE 3

|  | Creep (25° C., μm) | Creep (85° C., μm) | Modulus (30° C., PA) | Modulus (120° C., PA) | Pencil hardness of polarizing plate on adhesive film | Durability 85° C. | Thermal stress at −40° C./ 85° C. | 60° C. and 95% RELATIVE HUMIDITY | Light Leakage |
|---|---|---|---|---|---|---|---|---|---|
| Example 1 | 75 | 426 | 346,000 | 70,300 | 2 H | ◯ | ◯ | ◯ | ◯ |
| Example 2 | 86 | 395 | 334,000 | 59,000 | 2 H | ◯ | ◯ | ◯ | ◯ |
| Example 3 | 88 | 365 | 312,000 | 30,500 | 3 H | ◯ | ◯ | ◯ | ◯ |
| Example 4 | 90 | 402 | 302,000 | 28,300 | 3 H | ◯ | ◯ | ◯ | ◯ |
| Example 5 | 88 | 329 | 357,000 | 51,600 | 3 H | ◯ | ◯ | ◯ | ◯ |
| Example 6 | 94 | 285 | 368,000 | 20,500 | 3 H | ◯ | ◯ | ◯ | ◯ |
| Example 7 | 75 | 355 | 408,000 | 26,300 | 3 H | ◯ | ◯ | ◯ | ◯ |
| Example 8 | 161 | 346 | 351,000 | 45,700 | 3 H | ◯ | ◯ | ◯ | ◯ |
| Example 9 | 85 | 351 | 365,000 | 34,600 | 3 H | ◯ | ◯ | ◯ | ◯ |
| Comparative Example 1 | 278 | 421 | 110,000 | 33,500 | H | ◯ | ◯ | ◯ | ◯ |
| Comparative Example 2 | 204 | 687 | 158,000 | 48,300 | H | ◯ | ◯ | ◯ | ◯ |
| Comparative Example 3 | 355 | 451 | 79,000 | 45,500 | 4 B | ◯ | ◯ | ◯ | ◯ |

As can be seen from Table 3, the adhesive films for polarizing plates according to the present invention had low creep at high modulus at room temperature such that the polarizing plate could have high pencil hardness as measured on the adhesive film, and had high creep and low modulus at high temperature, thereby improving light leakage characteristics.

Accordingly, embodiments of the present invention provide an adhesive film for polarizing plates, which can increase pencil hardness of a polarizing plate on the adhesive film.

Embodiments of the present invention provide an adhesive film for polarizing plates, which exhibits high modulus at room temperature so as to increase pencil hardness of the polarizing plate on the adhesive film and also exhibits significantly low modulus at high temperature and/or high temperature/humidity conditions so as to suppress light leakage while improving durability.

Embodiments of the present invention provide an adhesive film for polarizing plates, which can exhibit improved durability even under thermal impact conditions from low temperature to high temperature.

Further, embodiments of the present invention provide a polarizing plate including the adhesive film for polarizing plates.

Further, embodiments of the present invention provide an optical display including the adhesive film or the polarizing plate according to the present invention.

Conversely, the adhesive films of Comparative Examples 1 and 2, prepared without using the cellulose ester binder, had high creep at room temperature and provided low pencil hardness to the polarizing plate. The adhesive film of Comparative Example 3, which included the cellulose ester binder and was prepared using a copolymer not including an alicyclic group and/or a hetero-alicyclic group, provided low pencil hardness to the polarizing plate.

While some embodiments of the present invention have been described herein, it should be understood that various modifications, changes, alterations, and equivalent embodiments can be made by those skilled in the art without departing from the spirit and scope of the invention.

What is claimed is:

1. An adhesive film for polarizing plates formed of an adhesive composition comprising:
    a (meth)acrylic copolymer containing an alkyl group, a hydroxyl group, an alicyclic group, and a hetero-alicyclic group; and
    a cellulose ester binder,
    wherein the adhesive film having a modulus at 30° C. of about 100,000 Pa to about 450,000 Pa,
    wherein the cellulose ester binder is present in an amount of about 5 parts by weight to about 30 parts by weight relative to 100 parts by weight of the (meth)acrylic copolymer, and
    wherein the adhesive film has a creep of about 200 μm or less at 25° C. and a creep of about 250 μm to about 800 μm at 85° C.

2. The adhesive film for polarizing plates according to claim 1, wherein the adhesive film has a modulus ratio of about 1.5 to about 50 as represented by Equation 1:

$$\text{Modulus ratio} = A/B, \quad \text{Equation 1}$$

where A is the modulus of the adhesive film at 30° C. and B is the modulus of the adhesive film at 120° C.

3. The adhesive film for polarizing plates according to claim 1, wherein the adhesive film has a modulus of about 80,000 Pa or less at 120° C.

4. The adhesive film for polarizing plates according to claim 1, wherein the (meth)acrylic copolymer is a copolymer of a monomer mixture comprising an alkyl group-containing (meth)acrylic monomer, a hydroxyl group-containing (meth)acrylic monomer, an alicyclic group-containing (meth)acrylic monomer, and a hetero-alicyclic group-containing (meth)acrylic monomer.

5. The adhesive film for polarizing plates according to claim 4, wherein the alicyclic group-containing (meth)acrylic monomer is present in an amount of about 1 mol % to about 30 mol % in the monomer mixture.

6. The adhesive film for polarizing plates according to claim 4, wherein the hetero-alicyclic group-containing (meth)acrylic monomer is present in an amount of about 1 mol % to about 20 mol % in the monomer mixture.

7. The adhesive film for polarizing plates according to claim 4, wherein the alicyclic group-containing (meth)acrylic monomer and the hetero-alicyclic group-containing (meth)acrylic monomer are present in a mole ratio (alicyclic group-containing (meth)acrylic monomer:hetero-alicyclic group-containing (meth)acrylic monomer) of about 1:0.5 to about 1:40 in the monomer mixture.

8. The adhesive film for polarizing plates according to claim 4, wherein the alkyl group-containing (meth)acrylic monomer comprises an unsubstituted $C_4$ to $C_{12}$ alkyl group-containing (meth)acrylic acid ester alone or a mixture of the unsubstituted $C_4$ to $C_{12}$ alkyl group-containing (meth)acrylic acid ester and an unsubstituted $C_{15}$ to $C_{25}$ alkyl group-containing (meth)acrylic acid ester.

9. The adhesive film for polarizing plates according to claim 1, wherein the cellulose ester binder comprises at least one of cellulose acetate butyrate, cellulose acetate propionate, cellulose acetate, and cellulose propionate.

10. The adhesive film for polarizing plates according to claim 1, wherein the adhesive composition further comprises a curing agent.

11. The adhesive film for polarizing plates according to claim 10, wherein the curing agent comprises at least one of an isocyanate curing agent, a metal chelate curing agent, and an aziridine curing agent.

12. The adhesive film for polarizing plates according to claim 1, wherein the (meth)acrylic copolymer further comprises a tertiary amine group.

13. The adhesive film for polarizing plates according to claim 12, wherein the (meth)acrylic copolymer is a copolymer of a monomer mixture comprising about 40 mol % to about 95 mol % of an alkyl group-containing (meth)acrylic monomer, about 0.1 mol % to about 20 mol % of a hydroxyl group-containing (meth)acrylic monomer, about 1 mol % to about 30 mol % of an alicyclic group-containing (meth)acrylic monomer, about 1 mol % to about 20 mol % of a hetero-alicyclic group-containing (meth)acrylic monomer, and about 0.001 mol % to about 15 mol % of a tertiary amine group-containing (meth)acrylic monomer.

14. The adhesive film for polarizing plates according to claim 1, wherein the (meth)acrylic copolymer further comprises a tertiary amine group and a carboxyl group.

15. An adhesive film for polarizing plates formed of an adhesive composition comprising:
    a (meth)acrylic copolymer containing an alkyl group, a hydroxyl group, an alicyclic group, a hetero-alicyclic group, a tertiary amine group and a carboxyl group; and
    a cellulose ester binder,
    wherein the adhesive film has a modulus at 30° C. of about 100,000 Pa to about 450,000 Pa,
    wherein the cellulose ester binder is present in an amount of about 5 parts by weight to about 30 parts by weight relative to 100 parts by weight of the (meth)acrylic copolymer, and
    wherein the (meth)acrylic copolymer is a copolymer of a monomer mixture comprising about 40 mol % to about 95 mol % of an alkyl group-containing (meth)acrylic monomer, about 0.1 mol % to about 20 mol % of a hydroxyl group-containing (meth)acrylic monomer, about 1 mol % to about 30 mol % of an alicyclic group-containing (meth)acrylic monomer, about 1 mol % to about 20 mol % of a hetero-alicyclic group-containing (meth)acrylic monomer, about 0.001 mol % to about 15 mol % of a tertiary amine group-containing (meth)acrylic monomer, and about 0.001 mol % to about 10 mol % of a carboxyl group-containing (meth)acrylic monomer.

16. A polarizing plate comprising an adhesive film, a polarizer stacked on the adhesive film, and an optical film stacked on the polarizer,
    wherein the polarizing plate has a pencil hardness of 2H or more, and
    wherein the adhesive film comprises the adhesive film according to claim 1.

17. An optical display comprising the adhesive film for polarizing plates according to claim 1.

* * * * *